US005707326A

United States Patent [19]

Hyllberg

[11] Patent Number: 5,707,326

[45] **Date of Patent: *Jan. 13, 1998**

[54] CHARGING ROLLER WITH BLENDED CERAMIC LAYER

[75] Inventor: Bruce E. Hyllberg, Gurnee, Ill.

[73] Assignee: American Roller Company, Union Grove, Wis.

[ * ] Notice: The term of this patent shall not extend beyond the expiration date of Pat. No. 5,600,414.

[21] Appl. No.: 699,086

[22] Filed: Aug. 16, 1996

Related U.S. Application Data

[63] Continuation of Ser. No. 402,805, Mar. 13, 1995, Pat. No. 5,600,414, which is a continuation of Ser. No. 973,447, Nov. 9, 1992, abandoned.

[51] Int. Cl.[6] .......... B23P 15/00

[52] U.S. Cl. .......... 492/53; 492/49

[58] Field of Search .......... 492/53, 56, 49; 29/895.32

[56] References Cited

U.S. PATENT DOCUMENTS

| | | | |
|---|---|---|---|
| 3,521,126 | 7/1970 | Granzow et al. | 317/3 |
| 4,743,940 | 5/1988 | Nagasaka et al. | 355/3 |
| 4,793,041 | 12/1988 | Jenkins et al. | 29/121 |
| 4,895,629 | 1/1990 | Castegnier et al. | 204/180 |
| 5,322,970 | 6/1994 | Behe et al. | 118/651 |
| 5,609,553 | 3/1997 | Hyllberg | 492/53 |

FOREIGN PATENT DOCUMENTS

| | | |
|---|---|---|
| 3-20764 | 1/1991 | Japan . |

*Primary Examiner*—Irene Cuda
*Attorney, Agent, or Firm*—Quarles & Brady

[57] ABSTRACT

A charging roller for use in a xerographic copying machine includes a cylindrical roller core, and a ceramic layer formed by plasma spraying a blend of an insulating ceramic material and a semiconductive ceramic material in a ratio which is selected to control an RC circuit time constant of the ceramic layer in response to an applied voltage differential. The ceramic layer is sealed with a solid, low viscosity sealer, such as Carnauba wax, to protect the ceramic layer from moisture penetration.

46 Claims, 2 Drawing Sheets

CHARGING ROLLER WITH BLENDED CERAMIC LAYER

This is a continuation of application Ser. No. 08/402,805 filed Mar. 13, 1995 now issued as U.S. Pat. No. 5,600,414, which was a continuation of application Ser. No. 07/973,447 filed Nov. 9, 1992, now abandoned.

BACKGROUND OF THE INVENTION

1. Field of the Invention

The invention relates to charging rollers for use in xerographic reproduction machines.

2. Description of the Background Art

In a xerographic copy machine electric charge is applied to a photoreceptor drum (PRD). An image to be copied is scanned with a strong light source and then reflected to the photoreceptor drum. The light dissipates the charge on the PRD where there is no reflected image. The reflected image, which is now in the form of patterns of charges on the PRD, attracts particles of toner. The toner is typically a carbon black pigment with a thermoplastic binder. The particles of toner are transferred to the substrate (paper) and bonded to it using heat and pressure to form the completed copy. In another system, the charge may be first transferred to the substrate so that the toner is attracted to the substrate rather than to the PRD.

Depending on the technology of the copying system, both the electric charge and the toner can be delivered to the proper location by different means. Electric charge may be applied to the PRD by a corona charging wire or by a charge transfer roller, also more generally referred to as a charging roller.

If the charge is applied with a roller, the charging, discharging, and capacitance characteristics of the roller surface are important factors to the operation of the system. The charge transfer roller surface is charged to the proper voltage. Charge is transferred to the PRD. The charge transfer roller surface is then recharged for the next cycle. Prior to recharging, it may be discharged to produce a uniform surface and starting point for the next charging cycle.

Charge transfer rollers typically are coated or covered with a layer of semiconductive material. Coating materials can include rubber, thermoplastic, or thermoset compounds containing carbon black or other low resistance additives, and anodized aluminum with special sealers to give the proper electrical properties.

The surface layer of the charge transfer roller has both volume resistance properties and capacitance properties. For charging and discharging the charge transfer roller surface, the surface layer functions electrically as an RC series circuit, a resistor and capacitor in series. The layer therefore has a time constant, which is a function of the product of the resistance and capacitance (R*C). For a roller surface layer, this may be expressed in seconds per unit area (e.g. microseconds per square millimeter or seconds per square inch).

The time constant determines the rate at which the surface layer may be charged and discharged independent of the applied voltage (unless the resistance or capacitance are voltage dependent). Series RC circuits charge and discharge according to a certain well known exponential function of time. When time t=RC, the charge has increased to within 1/e of its final value, where the numerical value of e is 2.718. It takes one time constant to charge the capacitor in the RC circuit to 63.2% of the applied voltage and three time constants to charge to about 95%. The time constant of the surface layer determines the maximum rate (copies per minute) at which the charge transfer roller may effectively function in the system.

In addition to the time constant of the surface layer, the surface layer must also have sufficient dielectric strength to resist the applied voltage without arcing through the layer to the core of the charge transfer roller (which is either grounded or held at a fixed bias voltage).

If toner is applied to, or comes in contact with, the charge transfer roller, there may be a doctor blade (or other cleaning mechanism) that would cause abrasion and wear of the charge transfer roller surface, thereby changing its properties. Thus, a very abrasion resistant charge transfer roller surface coating is highly advantageous for extending the service life of the charge transfer roller.

Since the charge transfer roller must transfer a uniform surface charge, there may be tight dimensional tolerances on the diameter, runout, and taper of the roller surface, as well as a specified and uniform surface roughness.

One of the common materials used for the roller surface layer is a specially sealed, anodized aluminum. This material has the following disadvantages:

1) The thickness of a high quality electrical grade anodized surface layer is limited to abut 50 to 75 microns prior to any finishing operations, thereby limiting its dielectric strength.
2) Anodized layers are extremely porous and subject to dielectric failure from pinholes in the material. Even though the layer is primarily aluminum oxide, the porosity limits the compressive strength of the coating and its abrasion resistance.
3) In order for a high quality anodized surface layer to be formed, a high quality aluminum alloy must be used for the core body of the charge transfer roller. Also, the core body must be finished to tight dimensional tolerances (probably by diamond tooling) before applying the anodization process to produce a layer of uniform dimensions and electrical properties. Even so, the anodized coating thickness and properties may vary due to non-uniformities in the anodization bath and system.
4) The time constant of the layer may vary by plus or minus one order of magnitude (1/10 to 10×).

Rubber and thermoset surface layers have the following disadvantages:

1) Control of electrical properties through the use of additives is very difficult. The electrical resistance of the layer can easily vary by a factor of 100. Large variations within a single roller are also possible.
2) The abrasion resistance is low (especially rubber) compared to anodized aluminum.
3) Organic polymers age due to exposure to heat, chemicals, and oxygen. This changes and deteriorates their physical and electrical properties over time.
4) The electrical additives can themselves evaporate, leach out, bleed out or change (such as the breakdown of carbon black).
5) The process of applying the material to the metal core (molding, extrusion, etc.) can produce porosities and non-uniformities in the coating that affect its performance.

The present invention is intended to overcome the limitations of the prior art.

SUMMARY OF THE INVENTION

The invention relates to a ceramic charge transfer roller with superior and controllable electrical properties, such as its time constant.

The surface layer is a blend of at least two materials, one of which is an electrical insulator, and the other of which is a semiconductor.

In a specific embodiment, the charge donor roller comprises a cylindrical roller core, and a ceramic layer which is disposed around the cylindrical roller core. The ceramic layer is formed as a blend of an insulating ceramic material and a semiconductive material, in which the blending ratio is selected to control an RC circuit time constant relating to electrical response of the ceramic layer to an applied voltage differential.

Many embodiments will also include a seal coat penetrating and protecting the ceramic layer from moisture contamination, the seal coat also being selected to control a resulting RC circuit time constant relating to electrical response of the sealed ceramic layer to the applied voltage differential. The seal coat is typically a 100% solid organic material.

The insulating and semiconductive ceramic materials are blended in a ratio selected to produce a target RC circuit time constant. A specific insulating material can be either alumina or zirconia applied by plasma or thermal spraying, and a specific semiconductive ceramic material can be either titanium dioxide or chrome oxide applied by plasma or thermal spraying.

In a more detailed embodiment of the invention, the ceramic layer is formed by plasma spraying a blend of a first ceramic material mixing alumina and titania in a first ratio and a second ceramic material mixing alumina and titania in a second ratio.

The invention also relates to a method of making a charging roller which includes the steps of plasma spraying a blend of an insulating ceramic material and a semiconductive ceramic material to form a ceramic layer having a selected RC circuit time constant, and sealing the ceramic layer with a seal coat that is selected to control a resulting RC circuit time constant of the sealed ceramic layer.

Other objects and advantages, besides those discussed above, will be apparent to those of ordinary skill in the art from the description of the preferred embodiment which follows. In the description, reference is made to the accompanying drawings, which form a part hereof, and which illustrate examples of the invention. Such examples, however, are not exhaustive of the various embodiments of the invention, and, therefore, reference is made to the claims which follow the description for determining the scope of the invention.

DETAILED DESCRIPTION OF THE PREFERRED EMBODIMENT

Figure 1:
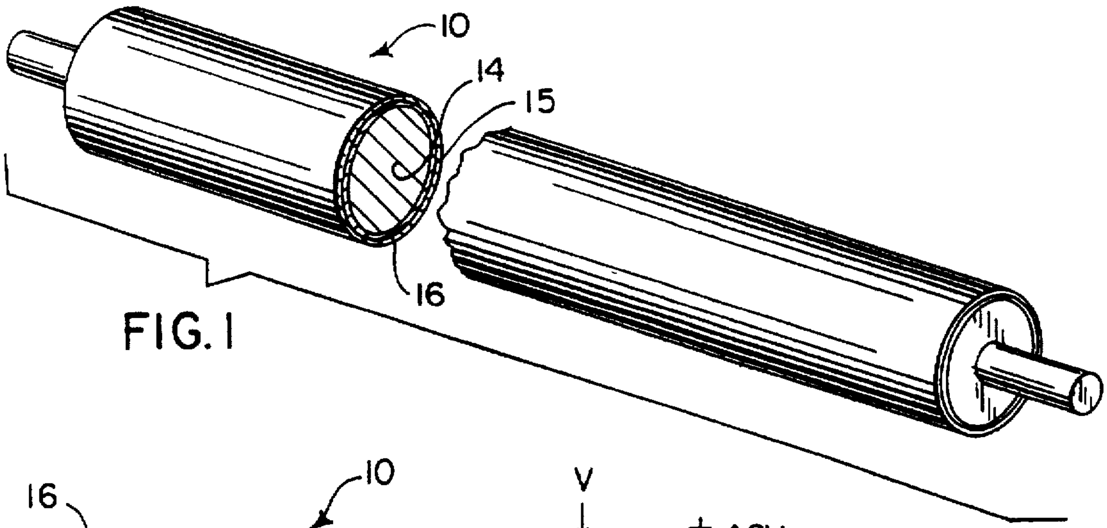
FIG. 1 is a perspective view of a roller of the present invention with parts broken away.
Figure 2:
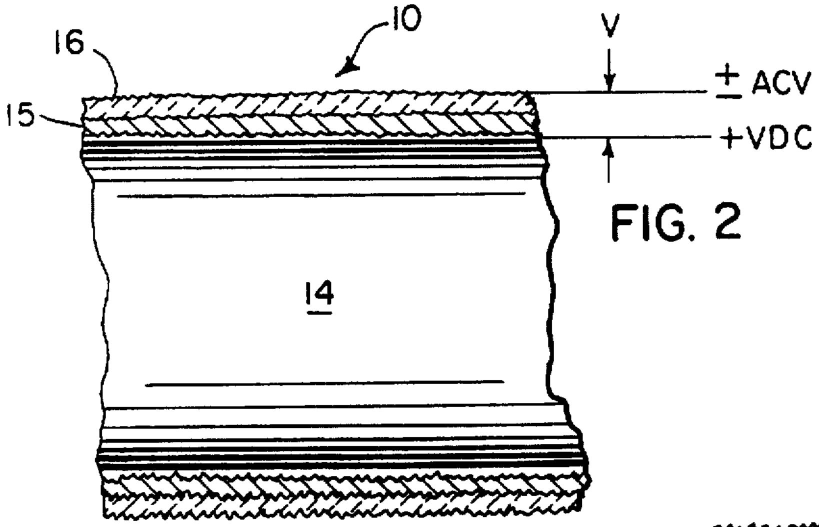
FIG. 2 is a longitudinal sectional view of a portion of the roller of FIG. 1.
Figure 3:
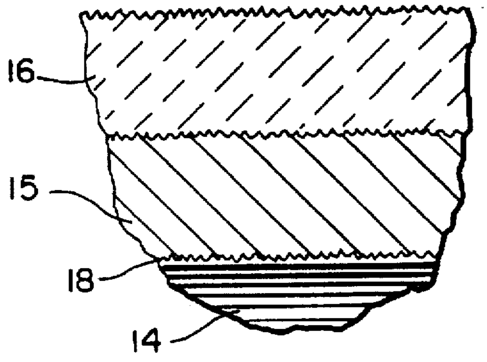
FIG. 3 is a fragmentary detail view of a portion of the roller of FIG. 2.
Figure 5:
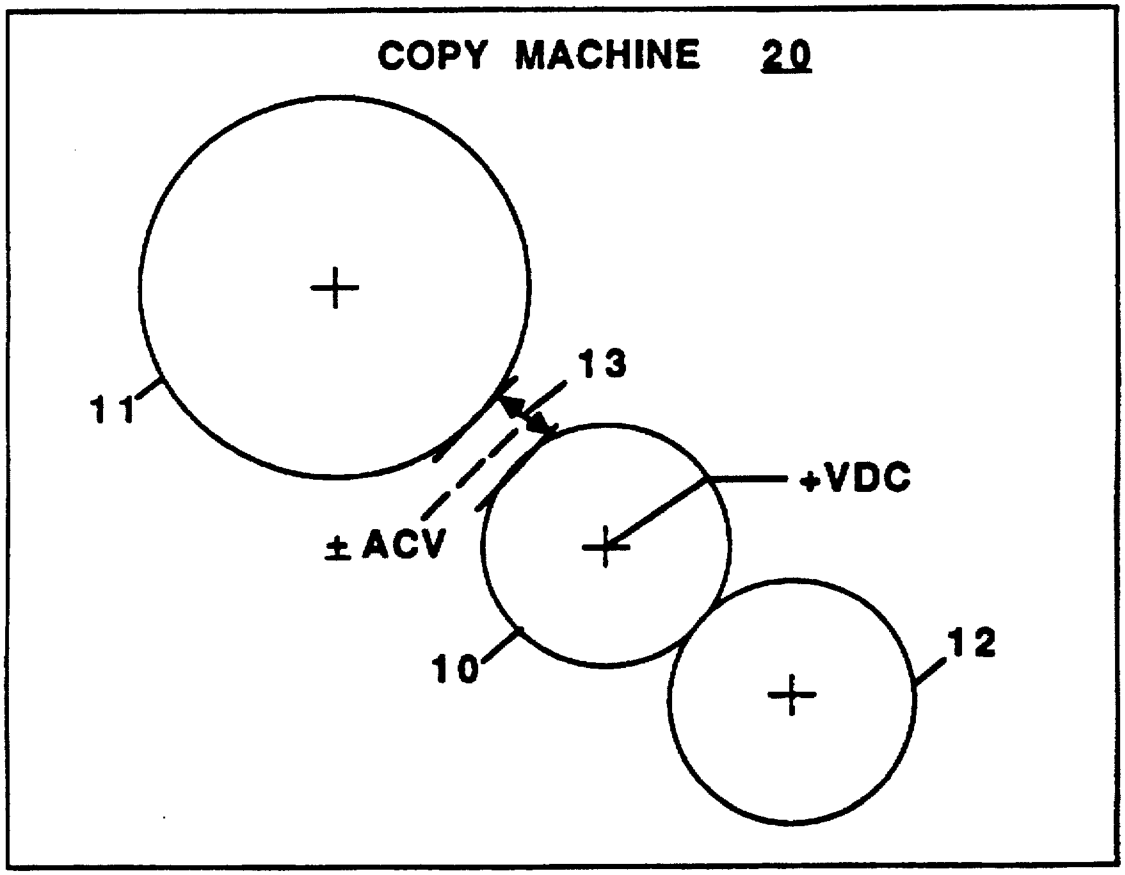
FIG. 5 is a schematic view of the roller of the invention in a xerographic copy machine.

Referring to FIGS. 1 and 2, the invention is incorporated in a charging roller, also sometimes referred to herein as a charge donor roller 10 and a method for making the same. FIG. 5 shows such a roller 10, in a xerographic copy machine 20 where electric charge is applied to a photoreceptor drum (PRD) 11. Toner is provided by toner pickup roller 12. A DC bias voltage +VDC is applied to the core of the roller 10, and an alternating voltage (±ACV) is applied in a gap 13 between charge donor roller 10 and PRD 11. It is in this gap 13 that toner is charged and then attracted to portions of the PRD 11 according to the pattern of image to be copied. The alternating voltage is of relatively higher frequency than 60 Hz, and the alternating voltage (±ACV) is such that a voltage differential (V) is provided across layers 15 and 16 as seen in FIG. 2.

As seen in FIGS. 1–4, a preferred embodiment of the charge donor roller 10 has a core 14, and a bonding layer 15 of 1 to 3 mils thickness (1 mil=0.001 inches) over the full outer surface of the core 14. The core material in the preferred embodiment is aluminum, but stainless steel, brass, some steels, glass, or an FRP composite type material can also be used.

Figure 4:
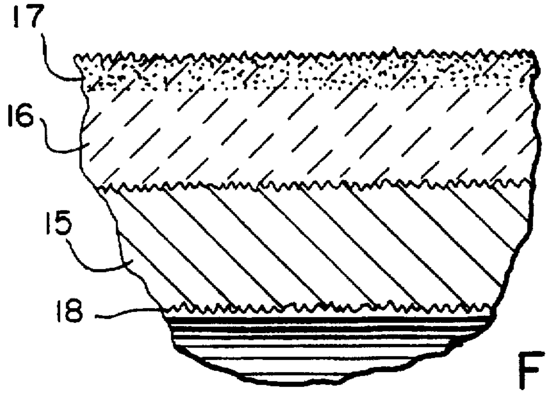
FIG. 4 is a fragmentary detail view of the roller of FIG. 3 after a seal coat has been applied.

A ceramic layer 16 of 6 to 10 mils thickness is applied over the full outer surface of the bonding layer 15. A seal coat 17 is applied to penetrate the surface of the ceramic layer as seen in FIG. 4.

The charge roller 10 is made as follows:

Step 1

Grit blast surface 18 of core 14 to clean and roughen it to about a 200 to 300 microinch $R_a$ surface.

Step 2

Apply a bonding layer 15 from 1 mil to 5 mils thickness of a nickel-aluminide material by plasma or thermal spraying with a 300 to 400 microinch $R_a$ surface finish such as Metco 450 or 480. This step is optional but will improve the bond strength of the ceramic 16 to the core 14.

Step 3

Apply a ceramic layer 16 of 10 mils to 15 mils thickness using a blend of alumina and titania and plasma spraying techniques and equipment.

This step is further carried out by spraying thin uniform sublayers to arrive at a desired thickness of the ceramic layer 16. The thinnest practical layer of plasma sprayed ceramic for an electrical grade coating having high integrity and uniformity is about 5 mils. In thinner layers, the peaks of the bond coat layer 15 may protrude through the ceramic layer 16. Plasma sprayed ceramic can also be applied in much thicker layers, as great as 100 mils.

The ceramic layer 16 has a substantially uniform, predictable dielectric strength. For example, a 10-mil thick blended ceramic coating made with the above-described method would have a dielectric strength of at least 3000 volts (at least 300 volts per mil), well in excess of what is needed for use as a charge donor roller. The ceramic layer 16 can be made as thick as necessary to provide the required dielectric strength or other physical or mechanical requirements.

Resistance increases in direct proportion to the thickness of the ceramic layer 16, but the capacitance of the ceramic layer 16 decreases in direct proportion.

Thus, the time constant, the product of resistance (R) and capacitance (C), does not change, or changes little, with ceramic layer thickness for a uniform material.

By changing the ratio of the insulating ceramic to the semiconductive ceramic in the blended ceramic layer 16, the time constant of the ceramic layer 16 can be adjusted over a range covering three orders of magnitude at low voltages and at least one order of magnitude at high voltage (over 1000v). The ratio can also be finely controlled relative to a selected value for the time constant.

Because the resistance of the ceramic decreases somewhat as the applied voltage increases, the applied voltage and current parameters should be defined prior to blending of the ceramic to achieve a target time constant.

The ceramic mixture consists of at least one insulating ceramic and one semiconductive ceramic. Blends of more than two materials are possible.

Alumina and zirconia are examples of oxide ceramics that are insulating materials. These typically have volume resistivities of $10^{11}$ ohm-centimeters or greater. As used herein, the term "insulating" material shall mean a material with a volume resistivity of $10^{10}$ ohm-centimeters or greater. As used herein, the term "semiconductive" material shall mean a material with a volume resistivity between $10^{3}$ ohm-centimeters and $10^{10}$ ohm-centimeters. Titanium dioxide ($TiO_2$) and chromium oxide ($Cr_2O_4$) are examples of semiconductive or lower resistance ceramics. These ceramics have volume resistivities typically of $10^{8}$ ohm-centimeters or lower. There are many other examples of materials in both categories that are commercially available. These relatively high and low resistance materials can be blended to achieve the proper balance of electrical properties for the charge transfer roller application.

It is noted that plasma spray ceramic powders are not pure materials. Even the purest alumina commercially available is only 99.0% to 99.5% pure. Many grades of alumina contain several percent by weight of other metal oxides. For example, white or gray alumina may contain titania (titanium dioxide) ($TiO_2$) in amounts from less than 5% up to at least 40%. An increase in the percentage of titania in the blend lowers the resistance of the material and increases its capacitance (but to a lesser degree) thereby decreasing the time constant of the material. Even though these materials are available as single powders, they are still blends of various ceramics. The electrical properties of the final ceramic layer are the sum of the individual contributions to resistance, capacitance, dielectric strength, etc. A single powder may be available that would exactly meet the electrical requirements for the charge transfer roller application. It would no doubt not be a pure material.

The preferred ceramics are Metco 130 (87/13 alumina/titania) and Metco 131 (60/40 alumina/titania) in a 40/60 to 80/20 blend. Metco products are available from Metco Corp., Westbury, N.Y. The electrical properties of the coating are determined in large part by the ratio of alumina to titania in the finished coating. These two materials are easy to blend since they can be purchased in the same particle size range and they have nearly the same density.

The equivalent powders from the Norton Company, Worcester, Mass., are 106 and 108. These are chemically the same as Metco 130 and 131 but do not yield the same electrical properties. The same blend of Norton powders gives a lower resistance, a higher capacitance coating and a lower time constant.

The probable reason is that the alumina and titania are not prefused in the Metco powders where they are in the Norton powders. The Metco powders fuse in the plasma flame giving a somewhat different coating composition and different level of homogeneity.

For any ceramic layer containing titania (titanium dioxide), the resistance of the layer is also affected by the spraying conditions. Titania can be partially reduced to a suboxide by the presence of hydrogen or other reducing agents in the plasma flame. It is the suboxide (probably TiO rather than $TiO_2$) that is the semiconductor in the ceramic layer 16. Titanium dioxide is normally a dielectric material. The typical average chemical composition of titanium dioxide is 1.8 oxygen per molecule rather than 2.0 in a plasma sprayed coating. This level (and thus the coating properties) can be adjusted to some extent by raising or lowering the percent of hydrogen in the plasma flame. The normal primary gas is nitrogen or argon while the secondary gas is hydrogen or helium. The secondary gas raises the ionization potential of the mixture, thus increasing the power level at a given electrode current. For a typical Metco plasma gun, the hydrogen level is adjusted to maintain the electrode voltage in the gun between 74 and 80 volts.

Another successful blend of ceramics can be made from a mixture of 95% pure alumina, such as Metco 101 or Norton 110, and chromium oxide ($Cr_2O_3$), such as Metco 106 or 136. The ratio of the two powders would normally be in the 50/50 to 80/20 blend range. More care has to be taken with these powders since the chromium oxide has a higher density and tends to separate in the powder feeder.

Regardless of the mixture of powders used, the plasma spray parameters should be suitably adjusted to insure that the blend of materials in the finished ceramic layer 16 is the same as intended. All of the powders mentioned do not require the same power levels, spray distance, and other parameters. Thus, adjustment of spray distance, for example, may increase the deposit efficiency of one powder over the other and change the material blend in the finished coating.

The values of the time constant and resistance of the ceramic layer 16 are not linear with respect to the blend percentage of the ceramics. In the case of Metco 130 and 131 powders, the resistance increases linearly along one slope to about a 50/50 blend, then sharply increases along another slope.

Plasma sprayed ceramic coatings can be applied in one pass (layer) of the plasma gun or in multiple passes. The normal method for most types of coating applications is to apply multiple thin coatings of ceramic and build up to the required thickness. Although the ceramic layer described above has a uniform ceramic composition, the sublayers of ceramic in the resulting layer 16 do not have to have the same composition. The coating can be designed to have a different resistance at the surface than the average bulk of the material. This might be done 1) to change the way a charge is held at the surface of the roller without changing its bulk properties or 2) to compensate for the increased resistance of a topical coating.

Step 4

While the roller is still hot from the plasma or thermal spraying of the ceramic layer 16, a seal coat 17 is applied to the ceramic layer 16 using a dielectric organic material such as Carnauba wax or Loctite 290 weld sealant. The sealant is cured, if necessary, (Loctite 290), with heat, ultra violet light, or spray-on accelerators. The ceramic porosity level is generally less than 5% by weight (usually on the order of 2%). Once sealed, the porosity level has a minimal effect on the coating properties for this application.

The preferred types of materials are 100 percent solids and low viscosity. These include various kinds of waxes, low viscosity condensation cure silicone elastomers, and low viscosity epoxy, methacrylates, and other thermoset resins.

Liquid sealers such as silicone oil could be used alone, or liquids in solids, such as silicone oil in silicone elastomer. These may yield additional benefits to the charge transfer roller to provide some measure of release (non-stick properties) to toner, for example.

The sealer will generally be a high resistance material, although the electrical properties of the sealer do affect the overall properties of the sealed ceramic layers 16, 17. For example, sealing with Carnauba wax will result in a higher resistance of the sealed ceramic layer 16, 17 than Loctite 290 weld sealant because it is a better dielectric material. It is also possible to use a semiconductive sealant with a dielectric ceramic (without any semiconductive ceramic) to achieve the desired electrical properties.

A low resistance sealer could be used, such as a liquid or waxy solid type of antistatic agent, as long as the combination of ceramics and sealer yielded the proper electrical properties in the completed ceramic layer 16.

Topical coatings can also be applied to the roller 10 to provide additional properties and functions as long as the designed electrical properties can be maintained. For example, a thin layer of a Teflon® polytetrafluoroethylene (PTFE) material (possibly 1 mil thick or less) could be applied to the finished roller to provide release to the roller 10 surface or change the coefficient of friction. The effect on the roller would be minimized if the PTFE were very thin or if peaks of the ceramic protruded through it.

5) A final step is to grind and polish the sealed ceramic layer 16, 17 to the proper dimensions and surface finish (diamond, silicon carbide abrasives, etc.). After finishing, the ceramic layer 16, 17 is typically 6 to 10 mils thick with a surface finish 20 to 70 microinches $R_a$. In other embodiments, it may be thicker than 10 mils and vary in surface roughness from 10 to 250 microinches $R_a$.

The physical and electrical properties of the ceramic do not deteriorate over time or due to exposure to oxygen, moisture, or chemicals resulting in a long useful life for the product. Improved temperature resistance is also expected over anodized surfaces. Ceramic surfaces can perform at 600° F. consistently with slight effects on the electrical properties.

This has been a description of examples of how the invention can be carried out. Those of ordinary skill in the art will recognize that various details may be modified in arriving at other detailed embodiments, and these embodiments will come within the scope of the invention.

For example, although the invention is described with reference to a xerographic copy machine, the invention may have utility in other types of machines using image transfer rollers.

Therefore, to apprise the public of the scope of the invention and the embodiments covered by the invention, the following claims are made.

I claim:

1. A charging roller for assisting in charging toner in a machine, the charging roller comprising:

a cylindrical roller core;

a ceramic layer disposed around the cylindrical roller core;

wherein the ceramic layer is a plasma-sprayed blend of an insulating ceramic material and a semiconductive ceramic material; and wherein the insulating ceramic material and the semiconductive ceramic material are blended in a ratio to control an RC circuit time constant relating to the ceramic layer.

2. The roller of claim 1, wherein the ceramic layer includes a plurality of sublayers.

3. The roller of claim 2, wherein the ceramic layer has a thickness in a range from 0.006 to 0.010 inches inclusive.

4. The roller of claim 3, further comprising a sealant penetrating and protecting the ceramic layer from moisture contamination, said sealant also being selected to control an RC circuit time constant relating to electrical response of the sealed ceramic layer to the applied voltage differential.

5. The roller of claim 4, wherein the insulating ceramic material is alumina or zirconia; and wherein the semiconductive ceramic material is titanium dioxide or chromium oxide.

6. The roller of claim 4, wherein the sealant is a solid material.

7. The roller of claim 5, wherein the sealant is a Carnauba wax.

8. The roller of claim 1, wherein the ceramic layer has a thickness in a range from 0.006 to 0.010 inches inclusive.

9. The roller of claim 8, wherein the ceramic layer is formed in a plurality of sublayers which form the ceramic layer.

10. The roller of claim 9, further comprising a sealant penetrating and protecting the ceramic layer from moisture contamination, said sealant also being selected to control an RC circuit time constant relating to electrical response of the sealed ceramic layer to the applied voltage differential.

11. The roller of claim 10, wherein the insulating ceramic material is alumina or zirconia; and wherein the semiconductive ceramic material is titanium dioxide or chromium oxide.

12. The roller of claim 10, wherein the sealant is a solid material.

13. The roller of claim 10, wherein the sealant is a Carnauba wax.

14. The roller of claim 1, further comprising a sealant penetrating and protecting the ceramic layer from moisture contamination, said sealant also being selected to control an RC circuit time constant relating to electrical response of the sealed ceramic layer to the applied voltage differential.

15. The roller of claim 14, wherein the ceramic layer includes a plurality of sublayers which form the ceramic layer.

16. The roller of claim 14, wherein the ceramic layer has a thickness in a range from 0.006 to 0.010 inches inclusive.

17. The roller of claim 14, wherein the insulating ceramic material is alumina or zirconia; and wherein the semiconductive ceramic material is titanium dioxide or chromium oxide.

18. The roller of claim 14, wherein the sealant is a solid material.

19. The roller of claim 18, wherein the sealant is a Carnauba wax.

20. A charging roller for assisting in charging toner in a machine, the charging roller comprising:

a cylindrical roller core;

a ceramic layer disposed around the cylindrical roller core;

wherein the ceramic layer includes an insulating ceramic material and a semiconductive ceramic material; and wherein the ceramic layer is formed by plasma spraying a blend of the insulating ceramic material and the semiconductive ceramic material to form the ceramic layer around the roller core, while controlling a selected RC circuit time constant for the ceramic layer.

21. The roller of claim 20, wherein the plasma spraying is performed in a number of repetitions to apply successive sublayers which form the ceramic layer.

22. The roller of claim 20, wherein the plasma-sprayed ceramic layer is sealed with a sealant being selected to control a selected RC circuit time constant for the sealed ceramic layer.

23. The roller of claim 22, wherein the sealant is a solid material.

24. The roller of claim 23, wherein the sealant is a Carnauba wax.

25. The roller of claim 20, wherein the plasma-sprayed ceramic layer is sealed with a sealant being selected to control a selected RC circuit time constant for the sealed ceramic layer.

26. The roller of claim 25, wherein the plasma spraying step is performed in a number of repetitions to apply successive sublayers which form the ceramic layer.

27. The roller of claim 26, wherein the sealant is a solid material.

28. The roller of claim 27, wherein the sealant is a Carnauba wax.

29. The roller of claim 20, wherein the insulating ceramic material is alumina or zirconia; and wherein the semiconductive material is titanium dioxide or chromium oxide.

30. The roller of claim 29, wherein the plasma-sprayed ceramic layer is sealed with a sealant being selected to control a selected RC circuit time constant for the sealed ceramic layer.

31. The roller of claim 29, wherein the plasma spraying is performed in a number of repetitions to apply successive sublayers which form the ceramic layer.

32. The roller of claim 29, wherein the sealant is a solid material.

33. The roller of claim 32, wherein the sealant is a Carnauba wax.

34. The roller of claim 29, wherein the ceramic layer has a thickness in a range from 0.006 to 0.010 inches inclusive.

35. The roller of claim 34, wherein the plasma spraying is performed in a number of repetitions to apply successive sublayers which form the ceramic layer.

36. The roller of claim 35, wherein the plasma-sprayed ceramic layer is sealed with a sealant being selected to control a selected RC circuit time constant for the sealed ceramic layer.

37. The roller of claim 36, wherein the sealant is a solid material.

38. The roller of claim 37, wherein the sealant is a Carnauba wax.

39. The roller of claim 1, wherein:

the ceramic layer is a plasma-sprayed blend of a first material and a second material, said first material comprising the insulating ceramic material and the semiconductive ceramic material in a first ratio and said second material comprising the insulating ceramic material and the semiconductive ceramic material in a second ratio.

40. The roller of claim 39, wherein the insulating ceramic material is alumina and the semiconductive ceramic material is titanium dioxide.

41. The roller of claim 40, wherein the ceramic layer includes a plurality of sublayers.

42. The roller of claim 40, wherein the ceramic layer has a thickness in a range from 0.006 to 0.010 inches inclusive.

43. The roller of claim 20, wherein:

the ceramic layer is formed by plasma spraying a blend of a first material and a second material, said first material being a mixture of the insulating ceramic material and the semiconductive material in a first ratio and said second material being a mixture of the insulating ceramic material and the semiconductive ceramic material in a second ratio.

44. The roller of claim 43, wherein the insulating ceramic material is alumina and the semiconductive ceramic material is titanium dioxide.

45. The roller of claim 44, wherein the plasma spraying step is performed in a number of repetitions to apply successive sublayers which form the ceramic layer.

46. The roller of claim 44, wherein the ceramic layer has a thickness in a range from 0.006 to 0.010 inches inclusive.

* * * * *